UNITED STATES PATENT OFFICE.

SAMUEL RIDGWAY KENNEDY, OF PHILADELPHIA, PENNSYLVANIA.

METHOD OF TREATING MILK.

970,718. Specification of Letters Patent. Patented Sept. 20, 1910.

No Drawing. Application filed June 1, 1906. Serial No. 319,671.

*To all whom it may concern:*

Be it known that I, SAMUEL RIDGWAY KENNEDY, a citizen of the United States, residing at Philadelphia, in the county of Philadelphia and State of Pennsylvania, have invented certain new and useful Improvements in Milk-Products, of which the following is a specification.

My invention relates to a novel product derived from milk and to the process of producing the same.

It consists of a process of treating condensed milk by removing substantially all the sugar of milk and salts, and drying in the manner hereinafter described, the residue.

The process is as follows: The milk is condensed to about twenty one and a half degrees Baumé, then cooled preferably by passing over refrigerating tubes, to about 33 degrees Fahrenheit. It is then allowed to stand until the sugar of milk and salts crystallize, which will be only a short time if the cooling is done by passing over refrigerating tubes, but somewhat longer if cooled in bulk; it is then beaten or agitated, preferably in a beating engine having paddles which lessens its viscosity, and it is then filtered, preferably in a centrifugal to remove the crystallized sugar and salts. The filtrate is a smooth condensed milk free from grit. This smooth condensed milk, which consists of certain solids suspended in water, in which water there are probably some salts in solution, is pressed, to force out as much of the water, with the dissolved salts, as will come off in that way. The partly dried mass is then desiccated on heated rolls, after which it may be powdered or not as preferred. In order to produce an easily soluble and digestible product the drying rolls should not much exceed the temperature of 140 degrees Fahrenheit.

The product resulting from this process consists of a grayish white substance, either in flakes or powder, which contains the ingredients of ordinary milk from which it is formed, (and which will vary slightly of course with the particular milk used,) except that it lacks substantially all the sugar, salts and water. It is soluble slowly in cold water and in alkaline solutions and when in solution may be coagulated by heat or acids.

What I claim as new and desire to secure by Letters Patent is:

The process of treating milk which consists in condensing it, cooling it, causing the milk sugar and salts to crystallize, beating it to reduce the viscosity, filtering out the milk sugar and salts and drying the remainder.

In testimony whereof I affix my signature in presence of two witnesses.

SAMUEL RIDGWAY KENNEDY.

Witnesses:
ALBERT EUGENE TAYLOR,
JOHN MILLER.